(12) United States Patent
Renahy et al.

(10) Patent No.: US 7,958,291 B2
(45) Date of Patent: Jun. 7, 2011

(54) SUPPLEMENTAL COMMUNICATION INTERFACE

(75) Inventors: Florent Renahy, Aubagne (FR); Dominique Parlange, Trets (FR)

(73) Assignee: Atmel Rousset S.A.S., Rousset (FR)

( * ) Notice: Subject to any disclaimer, the term of this patent is extended or adjusted under 35 U.S.C. 154(b) by 35 days.

(21) Appl. No.: 11/548,104

(22) Filed: Oct. 10, 2006

(65) Prior Publication Data

US 2008/0147923 A1 Jun. 19, 2008

(51) Int. Cl.
*G06F 3/00* (2006.01)
(52) U.S. Cl. .......................................... 710/71; 710/33
(58) Field of Classification Search ................ 710/8, 11, 710/14, 71, 72, 100, 107, 110, 22, 305; 370/395, 370/438, 522; 375/242, 269, 356; 712/38; 713/322, 600
See application file for complete search history.

(56) References Cited

U.S. PATENT DOCUMENTS

| | | | |
|---|---|---|---|
| 4,368,512 A | 1/1983 | Kyu et al. | |
| 4,580,276 A * | 4/1986 | Andruzzi et al. | 375/269 |
| 4,593,281 A * | 6/1986 | Lare | 370/462 |
| 5,159,684 A * | 10/1992 | Kroll et al. | 710/104 |
| 5,241,541 A * | 8/1993 | Farrell et al. | 370/438 |
| 5,345,231 A | 9/1994 | Koo et al. | |
| 5,371,736 A | 12/1994 | Evan | |
| 5,457,786 A | 10/1995 | Roush | |
| 5,604,870 A * | 2/1997 | Moss et al. | 710/100 |
| 5,668,810 A | 9/1997 | Cannella, Jr. | |
| 5,758,127 A * | 5/1998 | MacAulay et al. | 710/71 |
| 5,809,519 A | 9/1998 | Lee | |
| 6,076,081 A | 6/2000 | Bass et al. | |
| 6,199,764 B1 | 3/2001 | Tsai | |
| 6,378,011 B1 * | 4/2002 | Moore et al. | 710/71 |
| 6,636,927 B1 | 10/2003 | Peters et al. | |
| 6,697,931 B1 * | 2/2004 | Jones et al. | 712/38 |
| 6,742,063 B1 * | 5/2004 | Hellum et al. | 710/66 |
| 6,776,339 B2 | 8/2004 | Piikivi | |
| 6,859,650 B1 | 2/2005 | Ritter | |
| 6,908,037 B2 | 6/2005 | Kim | |

(Continued)

FOREIGN PATENT DOCUMENTS

EP 1233531 8/2002

(Continued)

OTHER PUBLICATIONS

Microchip, PIC18F6585/8585/6680/8680 Data Sheet, 2004, Microchip, pp. 1-31, 109-123, 125-154, 189-227 and 275-343.*

(Continued)

*Primary Examiner* — Cheng-Yuan Tseng
(74) *Attorney, Agent, or Firm* — Fish & Richardson P.C.

(57) ABSTRACT

An apparatus includes a first interface having a communication channel through which data is transmitted to or received from a target device and a first control register that is configured to control, based at least in part on its contents, transmission or reception of data through the communication channel. The apparatus also includes a second interface having a second control register that is configured to control, based at least in part on its contents, transmission or reception of data through the communication channel. A circuit in the apparatus harmonizes the contents of the first control register and the second control register, such that an external controller can control transmission or reception of data through the communication channel by providing control data in a first format to the first control register or by providing alternate control data in a second different format to the second control register.

26 Claims, 4 Drawing Sheets

U.S. PATENT DOCUMENTS

| | | | |
|---|---|---|---|
| 6,931,470 B2* | 8/2005 | Ballantyne et al. | 710/107 |
| 6,962,293 B2 | 11/2005 | Kim | |
| 7,114,093 B2* | 9/2006 | Tardieux et al. | 713/600 |
| 7,127,236 B2 | 10/2006 | Khan et al. | |
| 7,191,262 B2* | 3/2007 | Sleeman | 710/62 |
| 7,228,372 B2* | 6/2007 | Yoshimura et al. | 710/110 |
| 7,305,510 B2* | 12/2007 | Miller | 710/305 |
| 7,475,171 B2* | 1/2009 | Honda | 710/52 |
| 7,480,747 B2* | 1/2009 | Bell et al. | 710/33 |
| 7,617,347 B2* | 11/2009 | Honda | 710/305 |
| 2002/0086704 A1 | 7/2002 | Meindl et al. | |
| 2003/0189096 A1 | 10/2003 | Markkanen et al. | |
| 2004/0029569 A1 | 2/2004 | Khan et al. | |
| 2004/0030601 A1 | 2/2004 | Pond et al. | |
| 2004/0065734 A1 | 4/2004 | Piikivi | |
| 2004/0127256 A1 | 7/2004 | Goldthwaite et al. | |
| 2004/0208066 A1 | 10/2004 | Burky et al. | |
| 2005/0045720 A1 | 3/2005 | Fruhauf | |
| 2005/0108571 A1 | 5/2005 | Lu et al. | |
| 2005/0238149 A1 | 10/2005 | De Leon | |
| 2006/0000900 A1 | 1/2006 | Fernandes et al. | |
| 2006/0022044 A1 | 2/2006 | Smets et al. | |
| 2006/0049258 A1 | 3/2006 | Piikivi | |
| 2006/0094356 A1 | 5/2006 | Dawidowsky | |
| 2006/0155913 A1 | 7/2006 | Nishikawa et al. | |
| 2006/0165060 A1 | 7/2006 | Dua | |
| 2008/0277482 A1 | 11/2008 | Parlange et al. | |

FOREIGN PATENT DOCUMENTS

| | | |
|---|---|---|
| EP | 1610256 | 12/2005 |
| JP | 2006-114054 | 4/2006 |
| WO | WO 00/74406 | 12/2000 |

OTHER PUBLICATIONS

Scientific Atlanta, "Digital Broadband Delivery System Phase 1.0—System Overview," 1997, 2 pages.

Atmel "Secure Microcontroller for Next-Generation (U)SIM Cards AT91SC512384RCT," 2006, 2 pages.

Atmel, "AT91SC512384RCT Next Generation of (U)SIM ICs," 2006, 2 pages.

"Philips and SKT join forces to simplify NFC development around the world," NXP press release, May 17, 2006, available at http://www.nxp.com/news/content/file_1237.html.

International Search Report & Written Opinion, PCT/US2007/080420, mailed Apr. 24, 2008, 11 pages.

"Reader to Reader technology," Inside Contactless, Jul. 30, 2004, available at http://www.smartcard.co.uk/articles/R2R%20Technology%201_0.pdf.

"Picoread and Picoread Chipset," Inside Contactless, available at http://www.insidecontactless.com/products/picoread_suite.php (last accessed Jan. 29, 2007).

ISO/IEC 14443-02 "Identification cards—Contactless integrated circuit(s)—Proximity cards. Part 2; Radio frequency power and signal interface," Jul. 1, 2001, 18 pages.

ISO/IEC 14443-3 "Identification cards—Contactless integrated circuit(s)—Proximity cards. Part 3: Initialization and anticollision," Feb. 1, 2001, 58 pages.

* cited by examiner

SUPPLEMENTAL COMMUNICATION INTERFACE

TECHNICAL FIELD

The disclosed implementations relate to electrical circuits.

BACKGROUND

A communication interface can be employed to facilitate data exchange between a first device and a second device. The communication interface can include a physical layer interface that transmits and receives information in the form of signals that are appropriately formatted (e.g., optical signals, electrical signals, radio frequency (RF) signals, etc.) for the medium (e.g., a fiber optic cable, a wire, an air interface, etc.) of a communication channel employed by the physical layer interface. The signals may be formatted to adhere to a standardized protocol. To provide data to the communication interface, or to receive data from the communication interface, the first device may employ one or more buffers and one or more control registers that are included in the communication interface; moreover, the first device may receive status information about transmission or reception of data through one or more status registers that are also included in the communication interface.

SUMMARY

In some implementations, an apparatus includes a first interface having a communication channel through which data is transmitted to or received from a target device and a first control register that is configured to control, based at least in part on its contents, transmission or reception of data through the communication channel; a second interface having a second control register that is configured to control, based at least in part on its contents, transmission or reception of data through the communication channel; and a circuit that harmonizes contents of the first control register and the second control register, such that an external controller can control transmission or reception of data through the communication channel by providing control data in a first format to the first control register or by providing alternate control data in a second different format to the second control register.

The communication channel can include a physical serial communication link. In some implementations, the physical serial communication link implements serial communication between two or more devices, and the serial communication substantially adheres to a serial peripheral interface (SPI) protocol, an inter-integrated circuit ($I^2C$) protocol, a 1-wire protocol, a system management bus (SMBus) protocol, or a proprietary serial communication protocol.

The first interface further can include a buffer that is configured to store data to be transmitted to the target device or data that has been received from the target device. The second interface can include a pointer that identifies a portion of the buffer. The second interface can include a buffer control circuit that alters the pointer in response to subsequent, different contents of the second control register. The buffer can include a plurality of portions, each portion corresponding to a discrete quantum of data that can be processed by the communication channel at one time. In some implementations, the quantum of data is one byte. Each portion of the plurality of portions can be memory-mapped to a discrete address value and can be individually addressable through the discrete address value by the external controller.

In some implementations, the first interface is a discrete, physical integrated circuit that is included in the apparatus. The first interface can be a preconfigured portion of an integrated circuit or a programmable device selected from the group consisting of programmable logic devices (PLDs) and field programmable gate arrays (FPGAs). Each of the first and second interface can include additional registers, wherein the second interface comprises fewer total registers than the first interface.

The second interface can be configured to automate more functions in hardware than can be automated by the first interface. The second interface can be configured such that less programming code is needed to interact directly with the second interface to effect transmission of data than is needed to interact directly with the first interface to effect a same transmission of data. The second interface can be configured such that less programming code is needed to interact directly with the second interface to process a reception of data than is needed to interact directly with the first interface to process a same reception of data.

In some implementations, an apparatus includes a first interface having a communication channel through which data is transmitted to or received from a target device and a first status register that provides status information about the first interface; a second interface having a second status register that provides secondary status information about the first interface; and a circuit that harmonizes contents of the first status register and second status register, such that an external controller can receive status information from the first status register in a first format or secondary status information from the second status register in a second format. The second status register can be configured to directly provide at least a portion of a discrete address value when the secondary status information contained in the second status register relates to a buffer portion corresponding to the discrete address value.

In some implementations, an apparatus includes a first interface having a communication channel through which data is transmitted to or received from a target device and a first control register that is configured to control, based at least in part on its contents, transmission or reception of data through the communication channel and a first status register that provides status information about the first interface; a second interface having a second control register that is configured to control, based at least in part on its contents, transmission or reception of data through the communication channel; and a second status register that provides secondary status information about the first interface; and a circuit that harmonizes contents of the first control register and the second control register, and harmonizes contents of the first status register and second status register such that an external controller can control transmission or reception of data through the communication channel by providing control data in a first format to the first control register or by providing alternate control data in a second different format to the second control register, and such that the external controller can receive status information from the first status register in a first format or secondary status information from the second status register in a second format.

In some implementations, an apparatus includes an interface having a control register that is configured to control, based at least in part on its contents, transmission or reception of data through a communication channel and a status register that provides status information about the interface; and a circuit that is configured to harmonize contents of at least one of the control register and another register or the status register and the other register; wherein the other register is associated with the communication channel, such that an external controller can a) control transmission or reception of data through the communication channel by providing control data in a first format to the control register or providing alternative control information in a second format to the other register or b) receive status information from the status register in a first format or alternate status information from the other register in the second format.

The apparatus can further include a second interface, wherein the second interface includes the other register. The other register can include a control portion and a status portion. The circuit can be configured to harmonize the contents of the control register with the control portion and harmonize the contents of the status register with the status portion. The interface can be configured to automate more functions in hardware than can be automated by the second interface. The interface can be configured such that less programming code is needed to interact directly with the interface to effect transmission of data than is needed to interact directly with the second interface to effect a same transmission of data. The communication channel can include a physical serial communication link. The second interface can be a discrete, physical integrated circuit that is included in the apparatus. The second interface can be a preconfigured portion of an integrated circuit or a programmable device selected from the group consisting of programmable logic devices (PLDs) and field programmable gate arrays (FPGAs).

In some implementations, a method includes controlling a first interface having a communication channel through which data is transmitted to or received from a target device, the controlling including controlling transmission or reception of data through the communication channel based at least in part on control information formatted according to a first format; and controlling a second interface, the second interface configured for transmission or reception of data through the communication channel, the controlling including controlling transmission or reception of data through the communication channel based at least in part on control information formatted according to a second different format. The second format can be configured such that a processor can execute less code to identify a memory portion associated with the transmission or reception of data from the second interface than from the first interface. The method can further include harmonizing a first register associated with the first interface with a second register associated with the second interface.

In some implementations, a method includes receiving a digital message from a communication channel; storing the message in a memory buffer; storing, in a first status register and in a first format, status information corresponding to the stored message; and storing, in a second status register and in a second format, supplemental status information corresponding to the stored message. The second format can be configured such that a processor can execute less code to identify the memory buffer from the supplemental status information than from the status information.

Receiving the digital message can include receiving the digital message serially, and the method can further include converting the received digital message to a parallel format. The method can further include extracting a data component from the message. Extracting the data component can include at least one of removing header or trailer information, decoding at least a portion of the message or performing error checking on at least a portion of the message. The method can further include asserting an interrupt signal upon storing the status information or the supplemental status information.

The details of one or more implementations are set forth in the accompanying drawings and the description below. Other features, objects, and advantages will be apparent from the description and drawings, and from the claims.

DESCRIPTION OF DRAWINGS

Like reference symbols in the various drawings indicate like elements.

DETAILED DESCRIPTION

Figure 1:
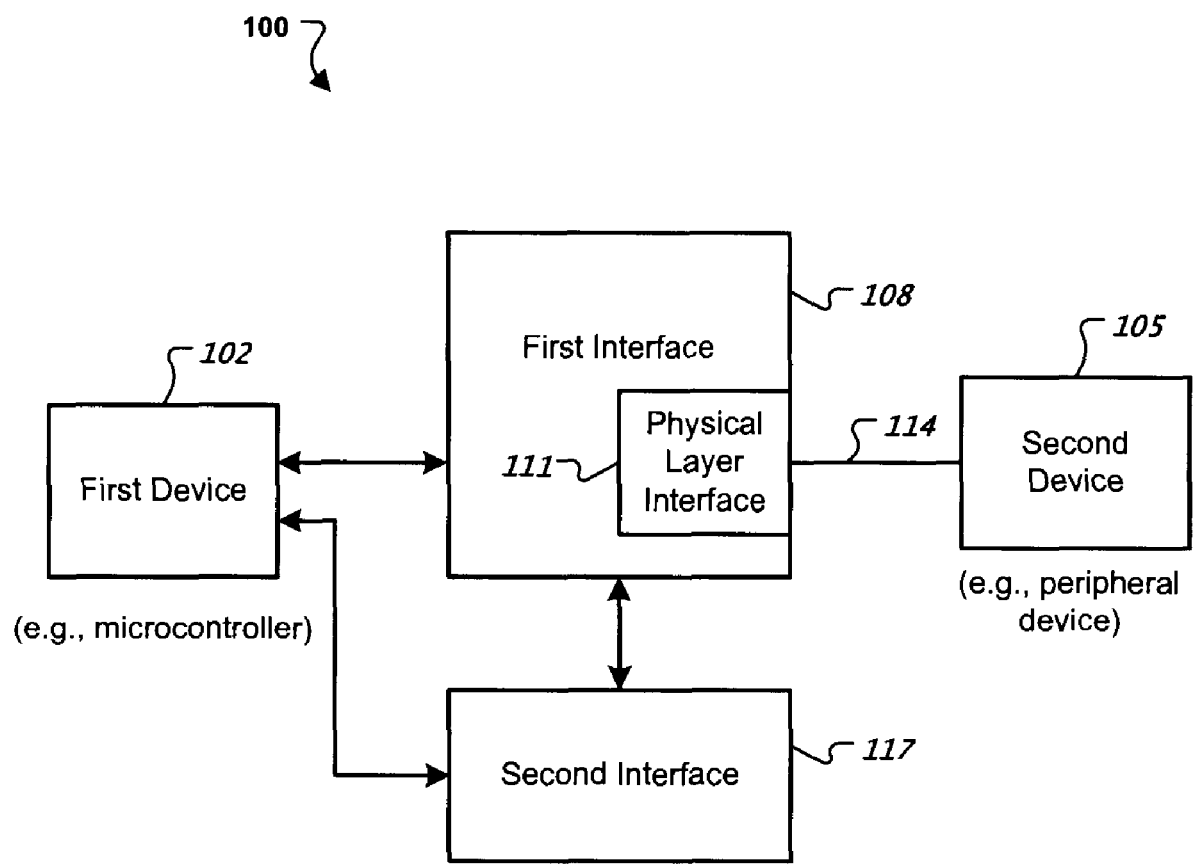
FIG. 1 is a block diagram of an exemplary system in which a first device can communicate with a second device through a first interface or a second interface.

FIG. 1 is a block diagram of a system 100 in which a first device 102 can communicate with a second device 105 through a first interface 108 or a second interface 117. As shown, the first interface 108 has a physical layer interface 111 that links the first interface 108 and the second device 105 through a communication channel 114. The first interface 108 primarily performs two functions: the first interface 108 transmits messages from the first device 102 to the second device 105, and the first interface 108 receives messages from the second device 105, and stores the messages in a location from which the first device 102 can retrieve the messages. Secondarily, the first interface 108 provides various status information related to the transmission or reception of messages across the communication channel 114.

The first device 102 and second device 105 can be any two devices that communicate with each other. For example, the first device 102 can be a microcontroller that can execute programming code, the second device 105 can be a peripheral device (e.g., a sensor or an input/output device) with which the microcontroller periodically communicates, and the communication channel 114 can include a medium (e.g., one or more wires, an optical fiber connection, radio frequency, etc.) and implement a protocol (e.g., a predefined pattern of signals that encode various operations in particular ways) by which the physical layer interface 111 and the second device 105 communicate.

In some implementations, the first interface 108 is designed to adhere to a particular standard. For example, the first interface 108 may implement a Serial Peripheral Interface (SPI) and adhere to a corresponding standard for SPI (e.g., a standard that characterizes required electrical conductors, waveforms and timing of signaling voltages on the required electrical conductors, and optionally, registers through which an external controller can control the SPI interface). As another example, the first interface 108 may implement a wired inter-integrated circuit ($I^2C$) interface and adhere to an $I^2C$ standard that specifies similar parameters as those mentioned with reference to SPI. As another example, the first interface 108 may implement an optical Gigabit Ethernet interface and accordingly adhere to a Gigabit Ethernet standard that specifies appropriate optical fiber, optical driver and receiver operating requirements, and waveform and timing requirements for optical signals transmitted over the specified fiber. As another example, the first interface 108 may implement a radio frequency-based near-field communication interface that adheres to, for example, ISO/IEC 18092 (International Standards Organization; International Electrotechnical Commission Standard 18092).

In some implementations, the first interface 108 is implemented in a self-contained device or circuit, such as a discrete physical integrated circuit or a pre-configured portion of a programmable device (e.g., a programmable logic device (PLD) or a field-programmable gate array (FPGA)). In such implementations, the first interface 108 may be designed in light of certain design goals, and the design goals can influence various trade-offs between, for example, performance, ease of use, flexibility and breadth of features. For example, discrete physical integrated circuits that implement various communication interfaces are sometimes designed with many different features to make them suitable for many different operating environments (e.g., a simple-package device may provide multiple different interfaces). As a result of these design goals, performance may be lower than in a device having fewer features.

A designer of a system, such as the system 100 that is shown in FIG. 1, may wish to employ the self-contained first interface 108, but the designer may have design goals that are different than the design goals under which the first interface 108 was designed. To meet the different design goals, the designer can include a second interface 117—which can be designed in light of the designer's goals and can interact with the first interface 108. In some implementations, the second interface 117 supplements the first interface 108, such that either one can be used. For example, the second interface 117 and the first interface 108 can be coupled such that an external controller, such as the microcontroller 102, can communicate with a second device, e.g., the peripheral device 105, through, for example, either the first interface 108 or the second interface 117.

In some implementations, the second interface 117 provides an additional interface layer on top of the first interface 108 and translates controller status information having a format appropriate for and unique to the second interface 117 to different control or status information having a format appropriate for and unique to the first interface 108 (e.g., the second interface 117 can harmonize status or control information between the two interfaces). The second interface 117 can be designed in light of design goals that are different than the design goals under which the first interface 108 was designed. For example, the second interface 117 can be designed to automate in hardware certain functions or operations that are only available in the first interface 108 through software.

Automating certain functions in hardware can transfer some of the complexity associated with controlling communications between the microcontroller 102 and the peripheral device 105 from programming code executed by the microcontroller 102 to the hardware that automates the functions or operations. In other words, in some implementations, simpler programming code or fewer programming code operations can be used to transmit or receive data through the second interface 117 than are required to transmit or receive the same data through the first interface 108.

Figure 2:
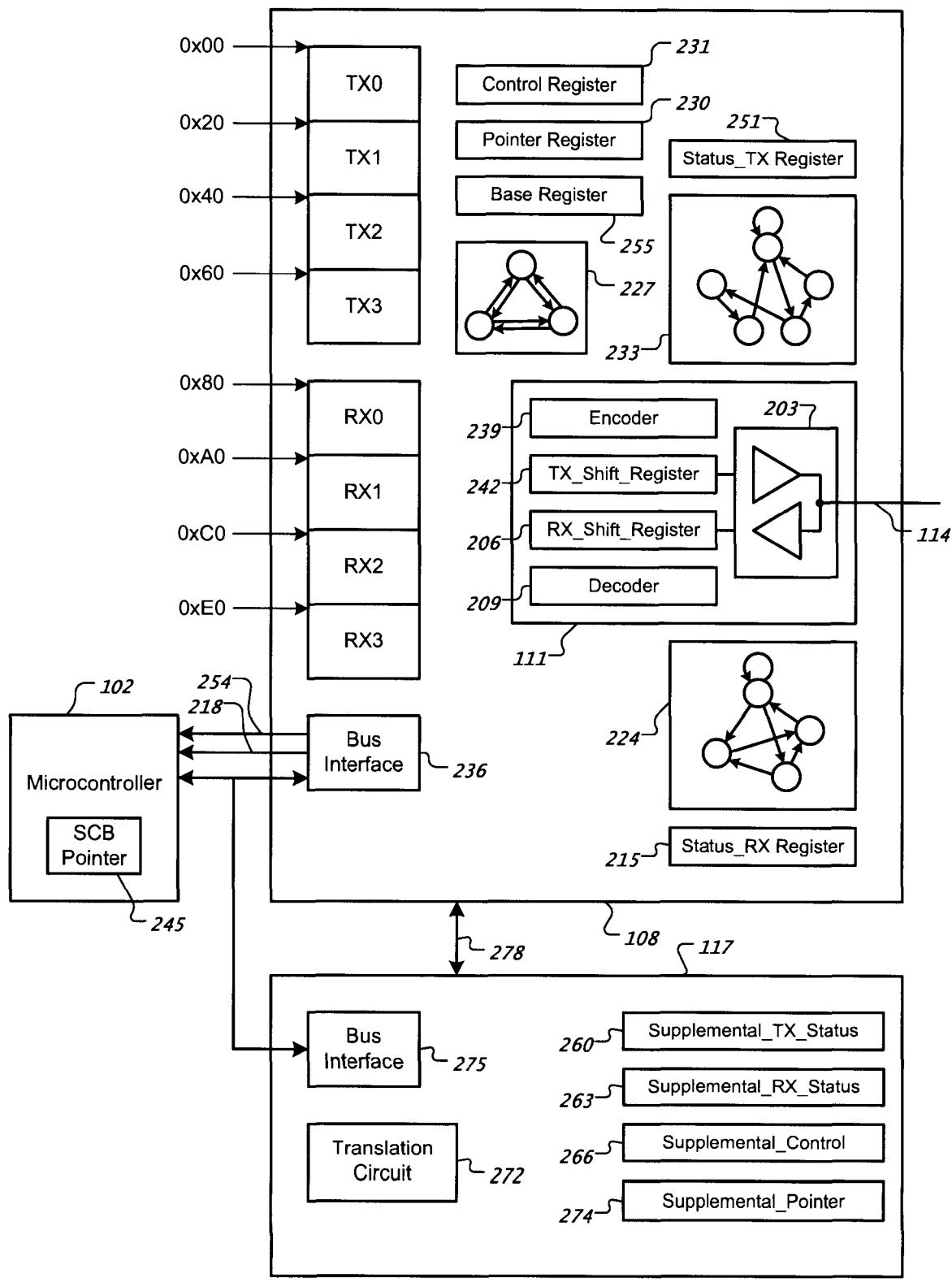
FIG. 2 is a block diagram showing exemplary details of the first interface and the second interface.

Additional details of the first interface 108 and second interface 117 are now provided with reference to FIG. 2. As described above, the first interface 108 primarily performs two functions: (1) the first interface 108 receives messages from the communication channel 114, decodes the received messages (if appropriate) and stores the received (decoded) messages in a location where the microcontroller 102 can retrieve them; and (2) receives messages from the microcontroller 102 to be transmitted across the communication channel 114, encodes the messages (if appropriate), and transmits the (encoded) messages across the communication channel 114 to a target device (e.g., the peripheral device 105 that is shown in FIG. 1). Secondarily, the first interface 108 can perform two additional functions: (3) the first interface 108 can provide an indication to the microcontroller 102 any time a message is received from the communication channel 114 and can further provide an indication of whether there was an error in reception; and (4) the first interface 108 can provide an acknowledgment any time a message received from the microcontroller 102 to be transmitted across the communication channel 114 is actually transmitted. The first interface 108 employs various resources to perform the above-mentioned functions, and these various resources are now described in greater detail.

To receive messages from the communication channel 114, the first interface 108 employs the physical layer interface 111 that, in one implementation as shown, includes a transceiver 203, a receive shift register 206 and a decoder 209. The transceiver 203 receives signals from the communication channel 114 in a format that is appropriate for the medium of the communication channel 114 and converts the received signals to electrical signals that can be digitally processed by other components of the physical layer interface 111. For example, for an optical communication channel, the transceiver 203 receives optical signals (e.g., visible light pulses, ultraviolet pulses, infrared pulses, laser light pulses, etc.) from an optical carrier (e.g., a fiber optic cable, an air interface, etc.) and converts the optical signals to electrical signals (e.g., digital signals). As another example, for radio frequency (RF) communication, the transceiver 203 receives RF signals (e.g., amplitude or frequency-modulated electromagnetic radiation within a particular frequency band) and converts the RF signals to electrical signals (e.g., digital signals). As another example, for RS-232 communication, the transceiver 203 receives electrical signals that adhere to a particular protocol for voltage waveforms and timing; and the transceiver 203 converts the RS-232 signals to signals having another electrical format (e.g., a digital format suitable for communication with devices in a CMOS (complementary metal oxide semiconductor) logic family, TTL (transistor-transistor logic) family, LVTTL (low-voltage TTL) family, PECL (positive-referenced emitter coupled logic) family, HSTL (high-speed transceiver logic) family, etc.).

In some implementations, the communication channel 114 is a serial communication channel, and the digital signals from the transceiver 203 are provided to the receive shift register 206 for serial-to-parallel conversion. In other implementations, the communication channel 114 is a parallel communication channel, and the signals are received at the transceiver 203 in parallel format. Accordingly, in such implementations, the receive shift register 206 can be omitted.

Parallel signals from the transceiver 203 (in the case of a parallel communication channel) or from the receive shift register 206 can be provided to a decoder 209. In some implementations, the decoder 209 removes data from a message. For example, the decoder 209 can strip off any header or trailer information from the message and can also perform any error checking that may be required in the protocol associated with the message (e.g., the decoder 209 can identify parity information or a cyclical redundancy check sum (CRC) in a message, calculate parity or CRC values based on the received data, and compare the sent and calculated parity or CRC values to ensure that the data was received without error).

As data is received through the transceiver 203, converted to a parallel format in the receive shift register 206 (as required), and decoded, the decoded data can be stored in a portion of memory dedicated to receive data. In one implementation, as shown, the first interface 108 includes four receive buffers for this purpose—RX0, RX1, RX2 and RX3. Data from a message can be received from the communication channel 114 and transferred to one of the receive buffers RX0-3 in small units (e.g., one byte at a time) until the message has been fully received, or until the buffer is full.

To transfer the received data from the transceiver 203 to one of the receive buffers RX0-3, the first interface 108 can employ a receive state machine 224, which in some implementations, works in conjunction with a main controller 227, a pointer register 230, a control register 231, and a receive status register 215. The pointer register 230 can identify one of the four buffers RX0-3 in which the data received by the physical layer interface 111 is to be stored. A mechanism by which the pointer register 230 is updated is described below. The main controller 227 can provide overall control and coordination of the first interface 108, including control of the receive state machine 224, the physical layer interface 111, a transmit state machine 233 and a bus interface 236—by which the microcontroller 102 or another external device can communicate with the first interface 108.

In some implementations, the receive status register 215 provides status for each of the four buffers RX0-3. For example, in one implementation, the receive status register 212 is characterized by the following:

| 7 | 6 | 5 | 4 | 3 | 2 | 1 | 0 |
|---|---|---|---|---|---|---|---|
| RX_Buffer3_Status | | RX_Buffer2_Status | | RX_Buffer1_Status | | RX_Buffer0_Status | | where RX_BufferN_Status is given by:

| | |
|---|---|
| 00 | Ready to receive - buffer is empty and available to receive data from the communication channel. |
| 01 | Full - buffer is full, having received data from the communication channel; data is available for the microcontroller to retrieve. |
| 11 | Error - data has been received from the communication channel, but there was an error in reception. |
| 10 | Reserved. |

Once the data has been transferred to one of the receive buffers, status information provided by a receive status register 215 can be updated, and the microcontroller can optionally be interrupted by assertion of a receive interrupt signal 218. Upon receiving the receive interrupt signal 218, the microcontroller 102 can read the receive status register 215 to identify the buffer from which data should be retrieved.

In some implementations, identifying the buffer from which data should be retrieved is a multi-step process. For example, if the microcontroller 102 has a load/store architecture, the microcontroller 102 generally reads the receive status register 215, masks out status information for one of the receive buffers, compares the masked-out information to a value corresponding to "fill" (e.g., "01," as described above), then masks out status information for another received buffer, compares the masked-out information to the value corresponding to "full," and so on, until status of all of the receive buffers has been checked. When, through this process, the microcontroller 102 determines the identity of a receive buffer whose contents are full, the microcontroller 102 then determines an address associated with that receive buffer.

In some implementations, the buffers RX0-3 and TX0-3 are memory mapped and are thus available to be read from or written to by the microcontroller 102 through the bus interface 236. In one implementation, the buffers are each 32-bytes in length and are contiguously mapped at addresses corresponding to the contents of a base register 255 and an offset. For example, as shown, TX0 has an offset of 0x00 from an address stored in the base register 255; TX1 has an offset of 0x20; RX0 has an offset of 0x80; and so on. Thus, to determine the address associated with a receive buffer identified through the process described above, the microcontroller 102, in some implementations, identifies the buffer number (e.g., TX2, RX3, etc.), determines the offset corresponding to the identified buffer number (e.g., though a look-up table), adds the offset to the contents of the base register 255 to obtain a starting address, then begins accessing (e.g., writing to or reading from) memory at the starting address.

Once the microcontroller 102 has retrieved contents of the buffer, a portion of the receive status register 215 corresponding to the buffer whose contents were retrieved can be reset (e.g., changed from having a status of "full" to having a status of "ready to receive") to allow the buffer to be reused. In some implementations, the receive status register 215 is a read-only register; thus, to reset the status of the appropriate buffer, the microcontroller 102 can write an appropriate value to the control register 231 (e.g., a "reset RX_BufferN" command, that specifies the reset command and the appropriate buffer number N). In response to such a write to the control register 231, the receive state machine 224 can update the receive status register 215.

To transmit messages across the communication channel 114 to another device, the first interface 108 employs additional resources, including, in one implementation as shown, four transmit buffers TX0, TX1, TX2 and TX3; the transmit state machine 233; and transmit resources in the physical layer interface 111, including an encoder 239 and, optionally, a transmit shift register 242 (e.g., in implementations in which the communication channel 114 is a serial communication channel).

In some implementations, the encoder 239 adds any necessary header or trailer information to a data message in one of the transmit buffers TX0-3; adds error checking information (e.g., parity or CRC information), if appropriate; and otherwise formats data messages according to any pertinent protocol employed by the communication channel 114 (e.g., into one or more data frames). If the communication channel 114 is a serial communication channel, the transmit shift register 242 can serialize an encoded message, and the transceiver 203 can convert digital serialized messages to a format that is appropriate for the medium of the communication channel 114 (e.g., optical signals; RF signals; electrical signals as characterized by an RS-232 standard; electrical signals in a CMOS, TTL, LVTTL, PECL, or HSTL format; etc.).

To transmit a message, the microcontroller 102 can store the message in one of the transmit buffers TX0-3. In some implementations, the transmit state machine 233 processes the transmit buffers TX0-3 in a sequential, circular manner.

That is, the transmit state machine 233 processes the contents of TX0 (e.g., transfers the contents of TX0 to the physical layer interface 111, where the contents are encoded, serialized and transmitted in the appropriate format of the communication channel 114), then processes the contents transmit buffer TX1, then TX2, then TX3, then TX0 again, and so on. Accordingly, in these implementations, the microcontroller 102 stores new messages to be transmitted in the "next available" transmit buffer, relative to the sequential, circular manner in which the transmit buffers are processed (e.g., if TX0 and TX1 are "full," and TX2 and TX3 are "empty," the microcontroller 102 stores the next message to transmit in TX2; if TX0, TX1 and TX2 are "empty," and TX3 is "full," the microcontroller 102 stores the next message to transmit in TX0; and so on).

Because the microcontroller 102 can generally fill transmit buffers TX0-3 at a different (e.g., faster) rate than the transmit state machine 233 can empty the buffers by transmitting their contents, two pointers are employed in the implementation shown: a current pointer register 230 to track which transmit buffer TX0-3 is currently being processed by the transmit state machine 233, and a second pointer to track the next available "empty" buffer that can be filled with new data to be transmitted. As depicted in FIG. 2, the second "SCB" pointer 245 (software current buffer) can be maintained by the microcontroller 102 (e.g., in software).

Once the message is stored in the next empty transmit buffer, the microcontroller 102, in one implementation, writes to the control register 231 to indicate that the buffer is full and ready to be transmitted. This write to the control register 231 can cause a transmit status register 251 to be appropriately updated, such that the just-filled buffer is added to a transmit "queue."

In some implementations, the transmit status register 251 provides status for each of the four transmit buffers TX0, TX1, TX2 and TX3. For example, in some implementations, the transmit status register 251 is characterized by the following:

| 7 | 6 | 5 | 4 | 3 | 2 | 1 | 0 |
|---|---|---|---|---|---|---|---|
| TX_Buffer3_Status | | TX_Buffer2_Status | | TX_Buffer1_Status | | TX_Buffer0_Status | | where TX_BufferN_Status is given by:

| | |
|---|---|
| 00 | Empty - buffer is empty and available to receive data from the microcontroller for transmission through the communication channel. |
| 01 | Ready to Send - buffer is full and ready to be transmitted. |
| 11 | Sending - the contents of the buffer are currently being transmitted across the communication channel. |
| 10 | Sent - transmission of the contents of the buffer has been completed. |

In some implementations, the transmit state machine 233 transmits contents of the transmit buffers according to the above-described sequential, circular order, and according to the status provided by the transmit status register 251. For example, after transmitting contents of one buffer, the transmit state machine 233 determines, from the transmit status register 251, whether the next buffer in the sequential, circular order has a status of "ready to send." If the status of the next transmit buffer is "ready to send," and if the communication channel 114 is available (e.g., the target device is ready to receive data in the case of a full-duplex communication channel, or the target device is ready to receive and the communication channel 114 is not currently being used to receive a message in the case of a half-duplex communication channel), the transmit state machine 233 sends the message. In some implementations, the transmit state machine 233 updates the pointer register 230 as it processes the transmission buffers TX0-3; the receive state machine 224 may also update the pointer register as it processes the receive buffers RX0-3.

In some implementations, the transmit state machine 233 updates the transmit status register when it begins sending a message (e.g., the transmit state machine 233 can update the transmit status register 251 to reflect a "sending" state for the buffer contents being sent) and again when the message transmission is complete (e.g., the transmit state machine 233 can update the transmit status register 251 to reflect a "sent" state for the buffer contents just transmitted).

In some implementations, the first interface 108 provides an interrupt signal 254 to the microcontroller 102 once the contents of a buffer are transmitted. The interrupt signal can serve as an acknowledgment, which the microcontroller 102 can use, for example, in determining whether to attempt to retransmit the buffer contents. In particular, in some implementations, if the microcontroller 102 is not interrupted to indicate successful transmission of a message within a predetermined period of time after the microcontroller stores the message in one of the transmit buffers, the microcontroller 102 can provide the message again, in a new buffer, and terminate, if necessary, the attempted transmission of the first-provided message.

In some implementations, only one transmit interrupt signal 254 and one receive interrupt signal 218 are provided; in other implementations, only a single interrupt signal (not shown) for both transmission and reception is provided. Accordingly, in order to identify the buffer for which transmission is being acknowledged, the microcontroller will generally have to read the contents of the transmit status register 251 and may also have to read the receive status register 215.

Reading the transmit status register 251 to identify the buffer for which transmission is being acknowledged can require several software operations. For example, if the microcontroller 102 has a load/store architecture, the microcontroller 102 generally reads the transmit status register 251, masks out status information for one transmit buffer, compares the masked-out information to the value corresponding to "sent" (e.g., "10," as described above), then masks out status information for another transmit buffer, compares that masked-out information to the value corresponding to "sent," and so on, until status has been checked for each transmit buffer. When, through this process, the microcontroller 102 determines the identity of a transmit buffer whose contents have been sent, a process (e.g., a software process running on the microcontroller 102) that originally provided the transmitted contents to the buffer can be acknowledged, and the status of the transmit buffer can be reset to "empty," such that the buffer is available for re-use.

In some implementations, the transmit status register 251 is a read-only register; thus, to reset the status of one of the transmit buffers, the microcontroller writes to the control register (e.g., with a "reset TX_BufferN" command), which causes the appropriate portion of the transmit status register 251 to be updated (e.g., from "sent" to "empty").

The second interface 117 can include additional resources, which, in some implementations, provide a supplemental interface to the resources provided by the first interface 108. As shown in one implementation, the second interface 117 includes a supplemental transmit status register 260, a supplemental receive status register 263, and a supplemental control register 266. The supplemental transmit status register 260, supplemental receive status register 263, and a supplemental control register 266 can, in some implementations, provide the same ultimate control and status capability as the transmit status register 251, receive status register 215 and control register 231, respectively. However, as will be described in greater detail below, the format of the supplemental registers 260, 263 and 266 can be different than the format of the status and control registers 251, 215 and 231.

In some implementations, the format of the supplemental registers is such that the microcontroller 102 can obtain status of the transmit buffers TX0-3 and receive buffers RX0-3, and control transmission and reception of data through the communication channel 114, with fewer software instructions by using the second interface 117 than by using the first interface 108. For example, the second interface 117 can determine certain status information in hardware, freeing up the microcontroller 102 for other tasks instead of determining the status information in software.

As depicted in one implementation, the second interface 117 also includes a translation circuit 272 that translates the contents of the transmit status register 251 from a first format associated with the first interface 108 to a second format associated with the second interface 117, translates the contents of the receive status register 215 from the first format to the second format, and receives control information in the second format through the supplemental control register 266 and converts it to another format (e.g., the first format) suitable for controlling the resources of the first interface 108. In other words, the translation circuit can "harmonize" status and control information between the first interface 108 and the second interface 117.

As shown in one implementation, the second interface also includes a supplemental pointer 274 and a bus interface 275. The microcontroller 102 can communicate with the second interface 117 through the bus interface 275. In some implementations, the supplemental pointer 274 can also be updated by the translation circuit 272, for example, in response to changes to either of the transmit status registers 251 or 260, either of the receive status registers 215 or 263, or either of the control registers 231 or 266 (i.e., the supplemental pointer 274 can, in some implementations, be maintained in hardware, rather than in software, as the SCB pointer 245 is maintained in some implementations). Exemplary details of the supplemental status register 260, supplemental receive status register 263 and supplemental control register 266 are now provided.

In some implementations, the supplemental transmit status register 260 provides status for each of the four transmit buffers TX0, TX1, TX2 and TX3 in a manner that minimizes the number of software operations necessary to identify the buffer for which status is being provided, and in particular, the offset of that buffer (e.g., in implementations in which the transmit buffers TX0, TX1, TX2 and TX3 are memory-mapped). Specifically, in some implementations, the supplemental transmit status register 260 is characterized by the following:

| 7 | 6 | 5 | 4 | 3 | 2 | 1 | 0 |
|---|---|---|---|---|---|---|---|
| Idle Status Code Or Offset | | | | 0 | 0 | 0 | 0 |

In this implementation, if the supplemental transmit status register 260 does not contain the idle status code (e.g., 0xF0 in some implementations), then it contains an offset value for the transmit buffer for which status is being reported.

For example, in the implementation shown in FIG. 2, a value in the supplemental transmit status register 260 of 0x00 can signify that the buffer contents of transmit buffer TX0 have been sent; a value of 0x20 can signify that the buffer contents of transmit buffer TX1 have been sent; a value of 0x40 can signify that the buffer contents of transmit buffer TX2 have been sent; and a value of 0x60 can signify that the buffer contents of transmit buffer TX3 have been sent. As described above, a value of 0xF0 can signify that there is no new transmit status for which action by the microcontroller 102 is required. If a software process running on the microcontroller 102 requires intermediate status (e.g., that contents of a buffer are currently being sent (status equal to "sending)), this intermediate status information is still available, in some implementations, from the transmit status register 251.

In some implementations, the only transmit status information that requires follow-up action from the microcontroller is the status that contents of a buffer have been sent. Such status information can be provided to a software process as an acknowledgment that the buffer contents previously provided by the software process were actually sent, after which the microcontroller 102 can reset the buffer status from "sent" to "empty," such that the buffer can be reused.

As described above, multiple software operations may be required to identify from the transmit status register 251 a buffer (and its offset) whose status is "sent." Since, in some implementations, the supplemental transmit status register 260 directly provides the offset of the buffer for which status is being provided—if there is status to provide—retrieving such status information can require fewer software operations. In particular, the microcontroller 102 can read the supplemental transmit status register 260 and determine if its value is equal to the idle status code; if it is not, then the buffer contents whose offset is provided by the register 260 have been sent. An appropriate software process can be acknowledged, and the transmit status register 260 can be reset to reflect an "empty" state. In some implementations, resetting the transmit status register 260 can be performed by writing a single bit to the supplemental control register 266, as is described below.

In some implementations, the supplemental receive status register 263 provides status for each of the four receive buffers RX0, RX1, RX2 and RX3 in a manner that minimizes the number of software operations necessary to identify the buffer for which status is being provided, and in particular, the offset of that buffer (e.g., in implementations in which the receive buffers RX0, RX1, RX2 and RX3 are memory-mapped). Specifically, in some implementations, the supplemental transmit status register 263 is characterized by the following:

| 7 | 6 | 5 | 4 | 3 | 2 | 1 | 0 |
|---|---|---|---|---|---|---|---|
| | | | Idle Status Code | | | | |
| | | | Or | | | | |
| | | | Offset (and Possible Error Code) | | | | |

In this implementation, if the supplemental receive status register 263 does not contain the idle status code (e.g., 0xF0 in some implementations), then it contains an offset value for the receive buffer for which status is being reported. For example, in the implementation shown in FIG. 2, a value in the supplemental receive status register 263 of 0x80 can signify that the buffer RX0 is full; a value of 0xA0 can signify that the buffer RX1 is full; a value of 0xC0 can signify that the buffer RX2 is full; and a value of 0xE0 can signify that the buffer RX3 is full. An additional bit, or additional bits, can be added to the offset value to indicate an error condition. For example, in some implementations, a value of 0x88 can signify a receive error in RX0; a value of a value of 0xA8 can signify a receive error in RX1; a value of 0xC8 can signify a receive error in RX2; and a value of 0xE8 can signify a receive error in RX3.

Thus, to obtain receive status information (e.g., upon receipt of a (receive) interrupt), the microcontroller 102 can read the supplemental receive status register 263, and determine if its value is equal to an idle code. If the value is not equal to the idle code, the microcontroller 102 can determine if an error code is present. If the error code is present, the non-error code portion of the supplemental receive status register 263 is, in some implementations, the offset of the receive buffer for which status is being reported. If the error code is not present, then the value of the supplemental receive status register 263 is the offset of the buffer for which status (e.g., "full") is being reported, in some implementations.

With the offset information, the microcontroller 102 can then retrieve the contents of the corresponding buffer (in the case of a "full" buffer indication) and reset the buffer status (e.g., to "ready to receive"); or, the microcontroller 102 can perform any actions necessary to correct an error condition, then reset the buffer status. In some implementations, resetting the status of either the supplemental receive status register 263 or the supplemental transmit status register 260 is straightforward, through use of the supplemental control register 266, which is now described in greater detail.

In some implementations, the supplemental control register 266, in conjunction with the supplemental pointer 274, facilitates straightforward updates to the transmit status register 251 and the receive status register 215. In particular, in one implementation, the supplemental control register is characterized by the following:

| 7 | 6 | 5 | 4 | 3 | 2 | 1 | 0 |
|---|---|---|---|---|---|---|---|
| Reset_TX | | | Start_TX | | | | Reset_RX |

Where the fields have the following meaning:

| | |
|---|---|
| [Any bit] = 0 | Do nothing. |
| Reset_TX = 1 | Set all buffers in the transmit status register 251 that currently have a status of "sent" (e.g., "10") to "empty" (e.g., "00"). |
| Start_TX = 1 | Set the status information in the transmit status register 251 corresponding to the buffer pointed to by the supplemental pointer 274 (described in more detail below) to "ready to send" and update the supplemental pointer 274. |
| Reset_RX = 1 | Set the status in the receive status register 215 corresponding to the buffer pointed to by the supplemental pointer 274 to "ready to receive," and update the supplemental pointer 274. |

In the implementation described above, the supplemental control register 266 can be used to control the first interface 108, as an alternative to the control register 231. In this implementation, control of the first interface 108 can require fewer software operations through the supplemental control register 266—particularly, for example, when the status information for which the control action is responsive is obtained from the supplemental transmit status register 260 or supplemental receive status register 263, rather than from the transmit status register 251 or the receive status register 215, respectively.

In some implementations, the supplemental pointer 274 provides a mechanism, in hardware, for the microcontroller 102 to track the next buffer to fill with data to be transmitted, or the next buffer from which data is to be retrieved (e.g., upon receipt of a receive interrupt). As mentioned above, the supplemental pointer 274 can be updated upon receipt of certain control information. For example, if the supplemental pointer 274 is configured to point to the next available transmit buffer (e.g., a buffer that has status "empty") and/or the receive buffer that is to be filled with data next (e.g., a buffer that has status "ready to receive" and is next in line according to a sequential, circular processing order), then a portion of the supplemental pointer 274 that points to the next available transmit buffer can be advanced (e.g., incremented according to a sequential, circular processing order, or another processing order) when a "start transmission" command is received. A portion of the supplemental pointer 274 that points to the next receive buffer from which data is to be retrieved (e.g., the next "empty" buffer, or next "full" buffer whose status has not yet been reset to "empty") can be advanced when a "reset reception" command has been received. In such implementations, separate instructions to be processed by the microcontroller 102 to update the SCB pointer 245 may be omitted.

To update the supplemental transmit status register 260 and the supplemental receive status register 263, the second interface can employ the translation circuit 272. In some implementations, the translation circuit 272 monitors bus cycles through the bus interface 275 and employs an internal state machine (not shown) to track the state of the first interface 108 and update the supplemental status registers 260 and 263 (e.g., in an implementation in which the first interface 108 is a physical, discrete, stand-alone device, whose internal resources are only available through the bus interface 236). In such implementations, the translation circuit 272 can initiate its own bus cycles to update the control register 231 in response to commands received in the supplemental control register 266, thereby relieving the microcontroller 102 of some software operations that otherwise might be necessary. In other implementations, the translation circuit 272 employs a direct connection 278 and an internal state machine (not shown) to track the state of the first interface 108 and update the supplemental status registers 260 and 263 accordingly (e.g., in an implementation in which the first interface 108 is a preconfigured FPGA or ASIC (application specific integrated circuit) component whose internal resources are accessible). The translation circuit 272 can also employ the direct connection 278 to update the control register 231 in response to commands received in the supplemental control register 266.

Figure 3:
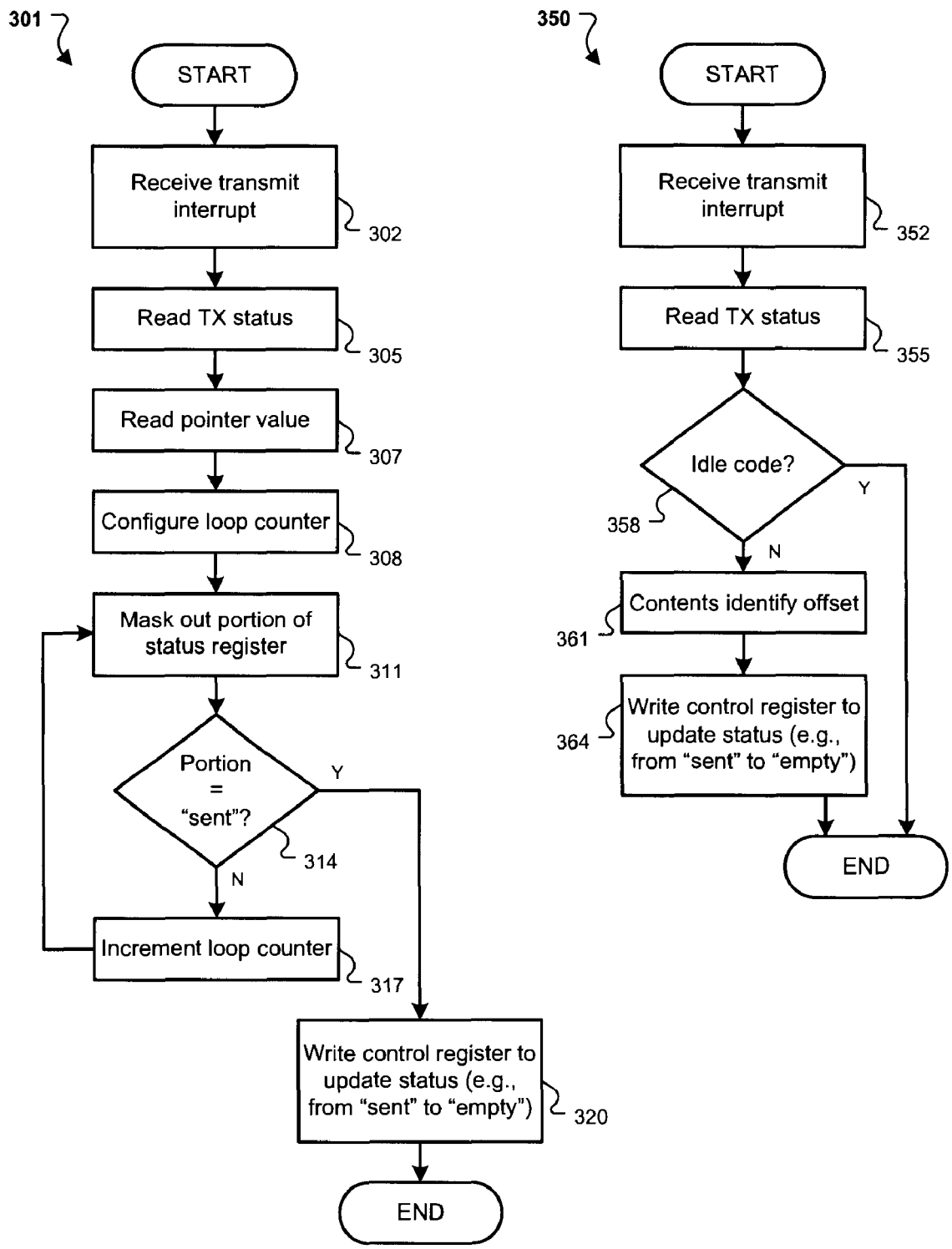
FIG. 3 illustrates an exemplary method of processing transmit status information using only the first interface, and an exemplary method of processing transmit status information using the second interface.

FIG. 3 illustrates an exemplary method 301 of processing transmit status information using only the first interface 108 described above, and an exemplary method 350 of processing transmit status information using the second interface 117 described above. The method 301 includes receiving (302) a transmit interrupt, and reading (305) a transmit status register in response to determine, for example, which transmit buffer contents have been sent. For example, the microcontroller 102 can receive a transmit interrupt from the transmit interrupt line 254, and read the transmit status register 251.

To process the contents of the transmit status register 251, the method 301 can include configuring (308) a loop counter. In one implementation as shown, the pointer register 230 can be read (307) before or as part of the process of configuring (308) the loop counter. For example, the microcontroller 102 can execute code to read (307) the pointer register 230 to identify the transmit buffer that is currently being processed. The microcontroller 102 can then increment or decrement (incrementing or decrementing not shown) the value read (307) in order to configure (308) the loop counter to initially correspond to a buffer that precedes or follows the buffer currently being processed (in the sequence in which the buffers are processed), since a buffer that precedes or follows the current buffer being processed is most likely, in some implementations, to be the buffer for which status is being reported. The method 301 can further include masking out (311) a portion of the bits in the transmit status register (e.g., bits chosen according to the loop counter value), and determining (314) whether the masked-out portion of the bits signify a "sent" condition. If the masked-out bits do not signify a "sent" condition, the loop counter can be incremented (317), and the process can be repeated until bits corresponding to a particular buffer with a "sent" status are identified. For example, the microcontroller 102 can execute code to configure a loop counter, mask out a portion of the bits in the transmit status register 251 (e.g., bits 7 and 6, corresponding, in some implementations, to TX3 status), and compare the masked-out bits to a value that signifies "sent" status (e.g., a value of "10" in some implementations). If the masked-out bits do not signify a sent condition, the microcontroller 102 can execute code to increment the loop counter, mask out other bits (e.g., bits 5 and 4, corresponding, in some implementations, to TX2 status) and determine if the new masked-out bits signify a "sent" condition. In this manner, status information can be processed for each of transmit buffers TX3-0 to determine which of the transmit buffers TX3-0 have a "sent" status. In some implementations, the above-described process terminates once one transmit buffer has been identified that has a "sent" status; thus, in these implementations, it is possible that status information for only a single transmit buffer will be processed.

Once a transmit buffer is identified that has a "sent" status, an appropriate process (e.g., a software process that provided the data to the identified transmit buffer to be sent) can be notified, and the retrieved address can then be used in a subsequent write (320) of control information to reset the status of the transmit buffer from "sent" to "empty." For example, if, through execution of code described above, the microcontroller 102 determines that the transmit buffer TX2 has a status of full, other code can be executed to notify an appropriate software process, and the control register 231 can be written appropriately to cause the status of the transmit buffer TX2 to be reset from "sent" to "empty."

As depicted in FIG. 3, the method 350 can, in some implementations, facilitate processing of transmit status information with fewer software operations, using the second interface 117. The method 350 can include receiving (352) a transmit interrupt, and reading (355) a transmit status register in response to determine, for example, which transmit buffer contents have been sent. For example, the microcontroller 102 can receive a transmit interrupt from the transmit interrupt line 254, and read the transmit status register 251.

To process the contents of the transmit status register, the method 350 can include determining (358) whether the contents of the transmit status register signify an "idle" code. If not, then the contents of the transmit status register can signify the address (e.g., offset) of the transmit buffer for which status is being reported. For example, the microcontroller 102 can read the supplemental transmit status register 260 and determine if the contents signify an "idle" condition (e.g., 0xF0 in some implementations). If the contents of the supplemental transmit status register 260 do not signify the "idle" condition, then the contents can identify (361) the offset of transmit buffer for which status is being reported. For example, a value of 0x40 can signify that status is being reported for transmit buffer TX2; in particular, the value of 0x40 can signify that the contents of transmit buffer TX2 have been sent.

The method 350 can further include writing (364) a value to a control register to reset the status of the identified transmit buffer from "sent" to "empty." For example, the microcontroller 102 can write a '1' to bit 7 of the supplemental control register 266 to cause the status of any transmit buffer whose status is currently "sent" in the transmit status register 251 to be reset to an "empty."

As is evident from the exemplary methods 301 and 350 depicted in FIG. 3 and described above, resources of the second interface 117 can, in some implementations, simplify the operations (e.g., reduce the number of programming code instructions that must be executed by the microcontroller 102) that would be otherwise required to process transmit status information that is provided by the first interface 108. In particular, the loop (311, 314, and 317) by which status of each buffer is individually checked can be eliminated. The second interface 117 can also simplify the processing of receive status information, as is now described with reference to FIG. 4.

Figure 4:
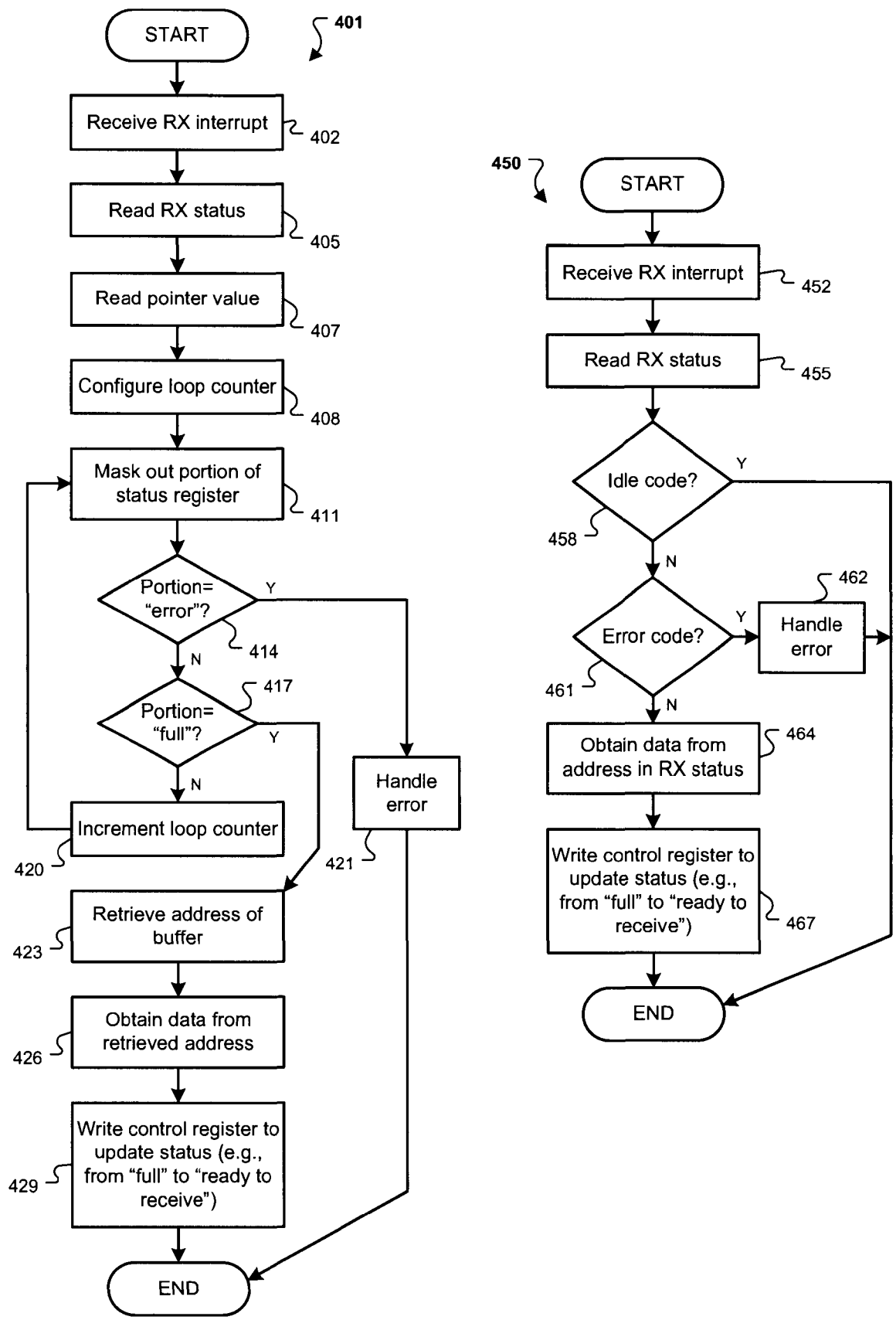
FIG. 4 illustrates an exemplary method of processing receive status information using only the first interface, and an exemplary method of processing receive status information using the second interface.

FIG. 4 illustrates an exemplary method 401 of processing receive status information using only the first interface 108 described above, and an exemplary method 450 of processing receive status information using the second interface 117 described above. The method 401 includes receiving (402) a receive interrupt, and reading (405) a receive status register in response to determine, for example, which receive buffer either has data that is available for retrieval or has a receive error condition. For example, the microcontroller 102 can be interrupted by the receive interrupt line 218, and can, in response, read the receive status register 215.

To process the contents of the receive status register, the method 401 can include configuring (408) a loop counter. In one implementation as shown, the pointer register 230 can be read (407) before or as part of the process of configuring (408) the loop counter. For example, the microcontroller 102 can execute code to read (407) the pointer register 230 to identify the receive buffer that is currently being processed. The microcontroller 102 can then increment or decrement (incrementing or decrementing not shown) the value read (407) in order to configure (408) the loop counter to initially correspond to a buffer that precedes or follows the buffer currently being processed (in the sequence in which the buffers are processed), since a buffer that precedes or follows the current buffer being processed is most likely, in some implementations, to be the buffer for which status is being reported. The method 401 can further include masking out (411) a portion of the bits in the status register according to the loop counter, and determining (414) whether the masked-out portion of the bits signify an error condition (e.g., "11" in some implementations). If the masked-out bits do not signify an error condition, then the method 401 can determine (417) whether the masked out bits signify whether the receive buffer corresponding to the loop counter has a status of "full" (e.g., "01" in some implementations). If the masked-out bits do not signify a "full" condition, the loop counter can be incremented (420), and the process can be repeated until bits corresponding to a particular buffer with an error condition or a "full" status are identified. For example, the microcontroller 102 can execute code to configure a loop counter, mask out a portion of the bits in the receive status register 215 (e.g., bits 7 and 6, corresponding, in some implementations, to RX3 status), and compare the masked-out bits to a value that signifies an error condition or a "full" status. If the masked-out bits do not signify a sent condition, the microcontroller 102 can execute code to increment the loop counter, mask out other bits (e.g., bits 5 and 4, corresponding, in some implementations, to RX2 status) and determine if the new masked-out bits signify an error condition or a "full" status. In this manner, status information can be processed for each of receive buffers RX3-0 to determine which of the transmit buffers RX3-0 have either an error condition or a "full" status. If an error condition is identified (414), the error condition can be appropriately handled (421). In some implementations, the above-described process terminates once one receive buffer has been identified that has a "full" status; thus, in these implementations, it is possible that status information for only a single receive buffer will be processed.

If a receive buffer is identified as being "full," an address corresponding to the buffer can be retrieved (423). For example, the microcontroller can employ a look-up table to provide an offset address (e.g., 0xA0, in the case of RX1) based on a value of the above-described loop counter. Once the address value is retrieved, the method 401 can include retrieving (426) data from the identified receive buffer, then resetting the status of the identified retrieve buffer (e.g., from "full" to "ready to receive"). For example, the microcontroller 102 can add the provided offset address to an address stored in the base register 255 to obtain an absolute address, and then retrieve data beginning at the absolute address.

When the data has been retrieved (426) from the "full" receive buffer, the method 401 can include writing (429) appropriate control information to reset the status of the receive buffer. For example, the microcontroller 102 can execute code to write an appropriate value to the control register 231 to cause the status of the receive buffer RX1 to be reset from "full" to "ready to receive."

As depicted in FIG. 4, the method 450 can, in some implementations, facilitate processing of receive status information with fewer operations, using the second interface 117. The method 450 can include receiving (452) a receive interrupt, and reading (455) a receive status register in response to determine, for example, which receive buffer has an error condition or a "full" status. For example, the microcontroller 102 can be interrupted by the receive interrupt line 218, and in response, read the supplemental receive status register 263.

To process the contents of the receive status register, the method 450 can include determining (458) whether the contents of the receive status register signify an "idle" code. If the contents of the receive status register do not signify an "idle" condition, then the method 450 can include determining (461) whether the contents of the receive status register signify an error condition. If so, then the portion of the receive status register that does not indicate the error condition can identify the receive buffer (e.g., the offset of the receive buffer) for which the error condition is flagged, and the error condition can be handled (462). If the contents of the receive status register do not signify an error condition, then the contents of the receive status register can signify the address (e.g., offset) of the receive buffer for which status (e.g., "full") is being reported. For example, the microcontroller 102 can read the supplemental receive status register 263, and determine if the contents signify an "idle" condition (e.g., 0xF0 in some implementations). If the contents of the supplemental transmit status register 263 do not signify the "idle" condition, then the microcontroller 102 can determine if the contents signify an error condition—for example, 0xN8 in some implementations, where N can be any value. If the contents signify an error condition, then the value 0xN0 can signify the offset of the receive buffer for which the error condition is flagged, and the error condition can be handled. If the contents of the supplemental receive status register 263 do not signify an error condition, then the contents can identify the offset of a receive buffer that has a "full" status. For example, a value of 0xA0 can signify that status is being reported for receive buffer RX1; in particular, the value 0xA0 can signify that receive buffer RX1 is "full."

Given the offset of a "full" receive buffer (e.g., RX1 at 0xA0), the contents of the receive buffer can be retrieved (464), and an appropriate value can be written (467) to a control register to reset the buffer from which data has been retrieved. For example, the microcontroller 102 can add the offset address from the supplemental receive status register 263 to an address stored in the base register 255 to obtain an absolute address, and then retrieve data beginning at the absolute address. After the microcontroller 102 has retrieved the data, the microcontroller 102 can write a '1' to bit 0 of the supplemental control register 266 to cause the portion of the receive status register 215 corresponding to the receive buffer RX1 to be updated from a status of "full" (e.g., "01") to a status of "ready to receive" (e.g., "00").

As is evident from the exemplary methods 401 and 450 depicted in FIG. 4 and described above, resources of the second interface 117 can, in some implementations, simplify the operations (e.g., reduce the number of programming code instructions that must be executed by the microcontroller 102) that would be otherwise required to process receive status information that is provided by the first interface 108.

A number of implementations have been described. Nevertheless, it will be understood that various modifications may be made without departing from the spirit and scope of the disclosed implementations. For example, various registers are described as having eight bits, but registers of other sizes can be employed. Buffers can employed of different sizes than those described, and different numbers of transmit and/or receive buffers can be employed. A "software current buffer" function can be provided by a single buffer (e.g., having a receive portion and a transmit portion) or by two separate buffers for receive and transmit buffer tracking. The first interface and/or second interface can issue a single interrupt for both transmit and receive actions, one interrupt for each of transmit and receive actions, or any number of interrupts to flag specific actions related to specific buffers. A microcontroller and a peripheral device are described as communicating through the first interface and second interface, but other devices can employ the first interface and second interface. Accordingly, other implementations are within the scope of the following claims.

What is claimed is:

1. An apparatus comprising:
   a first interface coupled to a first device and having:
      a communication channel through which data is transmitted to or received from a target device that is coupled to the first interface by the communication channel;
      a first transmit status register that specifies, in a first format, a transmit buffer status for the first interface; and
      a first control register that controls, based at least in part on its contents, transmission of data by the first interface and through the communication channel, the contents of the first control register being in the first format and including data specifying the transmit buffer status for the first interface;
   a second interface coupled to the first interface and the first device, the second interface having:
      a second transmit status register that specifies, in a second different format, the transmit buffer status for the first interface; and
      a second control register that controls, based at least in part on its contents, transmission of data by the first interface and through the communication channel, contents of the second control register that are used to control transmission being in the second different format and including data specifying the transmit buffer status for the first interface; and
   a circuit, coupled to the first interface and the second interface, that translates contents of the first control register from the first format to the second different format and translates contents of the second control register from the second different format to the first format, such that a same transmit buffer status is specified by both of the first control register and the second control register, wherein transmission of data is initiated by the first interface in response to the first control register receiving first control data in the first format from the first device, and wherein transmission of data is initiated by the first interface in response to the second control register receiving the first control data in the second different format from the first device.

2. The apparatus of claim 1, wherein the communication channel comprises a physical serial communication link, and wherein the first control register and the second control register each control transmission or reception of data using a shift register.

3. The apparatus of claim 2, wherein the physical serial communication link implements serial communication between two or more devices, the serial communication substantially adhering to a serial peripheral interface (SPI) protocol, an inter-integrated circuit ($I^2C$) protocol, a 1-wire bus protocol, a system management bus (SMBus) protocol, or a proprietary serial communication protocol.

4. The apparatus of claim 1, wherein the second interface comprises a pointer that identifies a portion of the transmit buffer.

5. The apparatus of claim 4, wherein the second interface comprises a buffer control circuit that alters the pointer in response to subsequent, different contents of the second control register.

6. The apparatus of claim 1, wherein the transmit buffer includes a plurality of portions, each portion corresponding to a discrete quantum of data that can be processed by the communication channel at one time.

7. The apparatus of claim 6, wherein the quantum of data is one byte.

8. The apparatus of claim 6, wherein each portion of the plurality of portions is memory-mapped to a discrete address value and individually addressable through the discrete address value by the first device.

9. The apparatus of claim 1, wherein the first interface is a discrete, physical integrated circuit that is included in the apparatus.

10. The apparatus of claim 1, wherein the first interface is a preconfigured portion of an integrated circuit or a programmable device selected from the group consisting of programmable logic devices (PLDs) and field programmable gate arrays (FPGAs).

11. The apparatus of claim 1, wherein each of the first and second interface comprises additional registers, wherein the second interface comprises fewer total registers than the first interface.

12. The apparatus of claim 1, wherein the second interface is configured to automate more functions in hardware than can be automated by the first interface.

13. The apparatus of claim 12, wherein the second interface is configured such that less programming code is needed to interact directly with the second interface to effect transmission of data than is needed to interact directly with the first interface to effect a same transmission of data.

14. The apparatus of claim 12, wherein:
   the second interface is configured such that less programming code is needed to interact directly with the second interface to process a reception of data than is needed to interact directly with the first interface to process a same reception of data.

15. An apparatus comprising:
   a first interface coupled to a first external controller and having:
      a communication channel through which data is transmitted to or received from a target device coupled to the first interface by the communication channel; and
      a first receive status register that provides a receive buffer status for the first interface to an external controller, the first receive buffer status being in a first data format;
   a second interface coupled to the first interface and the first external controller, the second interface having a second receive status register that provides, in a second different format, the receive buffer status to the external controller; and
   a circuit coupled to the second interface that transforms contents of the first status register from the first data format to the second different data format, and transforms contents of the second status register from the second different data format to the first data format, such that a same receive buffer status is available to the external controller by both of the first receive status register and the second receive status register.

16. The apparatus of claim 15, wherein the first interface further comprises a buffer that is configured to store data to be transmitted to the target device or data that has been received from the target device.

17. The apparatus of claim 16, wherein the buffer includes a plurality of portions, each portion corresponding to a discrete quantum of data that can be processed by the communication channel at one time.

18. The apparatus of claim 17, wherein the quantum of data is one byte.

19. The apparatus of claim 18, wherein each portion of the plurality of portions is memory-mapped to a discrete address value and individually addressable through the discrete address value by the external controller.

20. The apparatus of claim 19, wherein the second receive status register directly provides at least a portion of the discrete address value when the receive buffer status contained in the second receive status register relates to a buffer portion corresponding to the discrete address value.

21. A method comprising:
controlling a first interface of a first device having a communication channel through which data is transmitted to a second device, the controlling including controlling transmission of data by the first interface and through the communication channel based at least in part on first control data formatted according to a first data format, the first control data specifying updated transmit buffer status data for the first interface;
controlling, using a second interface of the first device, transmission of data by the first interface and through the communication channel, the controlling including controlling transmission of data by the first interface and through the communication channel based at least in part on second control data formatted according to a second different format, the second control data including the updated transmit buffer status data for of the first interface;
translating, to the second different format, first transmit buffer status data formatted according to the first format and stored in a first transmit status register that is associated with the first interface of the first device;
providing the first transmit buffer status data that has been translated to the second different format to a second status register of the second interface;
translating, to the first format, second transmit buffer status data formatted according to the second different format and stored in a second transmit status register that is associated with the second interface of the first device; and providing the second transmit buffer status data that has been translated to the first format to the first status register of the first interface.

22. The method of claim 21, wherein the second format is configured such that a processor can execute less code to identify a memory portion associated with the transmission or reception of data from the second interface than from the first interface.

23. A method comprising:
receiving, at a device, a digital message from a communication channel;
storing the message in a memory buffer;
storing, in a first receive status register of the device and in a first data format, receive buffer status information in response to storing the message in the memory buffer;
translating, from the first format to a second different format, the receive buffer status information stored in the first receive status register; and
storing, in a second receive status register of the device and in the second different format, the receive buffer status information that has been translated from the first format to the second different format;
wherein a processor of the device executes less code to identify the memory buffer using the receive buffer status information that is formatted according to the second different format than the amount of code that is executed to identify the memory buffer using the receive buffer status information that is formatted according to the first format.

24. The method of claim 23, wherein receiving the digital message comprises receiving the digital message serially, the method further comprising converting the received digital message to a parallel format.

25. The method of claim 23, further comprising extracting a data component from the message.

26. The method of claim 23, further comprising asserting an interrupt signal upon storing the status information or the supplemental status information.

* * * * *

UNITED STATES PATENT AND TRADEMARK OFFICE
CERTIFICATE OF CORRECTION

| | | |
|---|---|---|
| PATENT NO. | : 7,958,291 B2 | Page 1 of 1 |
| APPLICATION NO. | : 11/548104 | |
| DATED | : June 7, 2011 | |
| INVENTOR(S) | : Florent Renahy | |

It is certified that error appears in the above-identified patent and that said Letters Patent is hereby corrected as shown below:

Column 7, line 60, delete ""fill"" and insert --"full"--, therefor.

In Claim 21, column 21, line 25, after "for" delete "of".

Signed and Sealed this
Second Day of August, 2011

David J. Kappos
*Director of the United States Patent and Trademark Office*